(12) United States Patent
Mergen et al.

(10) Patent No.: US 7,746,970 B2
(45) Date of Patent: Jun. 29, 2010

(54) METHOD AND APPARATUS FOR FILTERING NOISY ESTIMATES TO REDUCE ESTIMATION ERRORS

(75) Inventors: Gokhan Mergen, Campbell, CA (US); Parvathanathan Subrahmanya, Sunnyvale, CA (US); Vijayaraj Alilaghatta-Kantharaj, Boulder, CO (US); Nitin Kasturi, Los Gatos, CA (US)

(73) Assignee: Qualcomm Incorporated, San Diego, CA (US)

( * ) Notice: Subject to any disclaimer, the term of this patent is extended or adjusted under 35 U.S.C. 154(b) by 852 days.

(21) Appl. No.: 11/489,087

(22) Filed: Jul. 18, 2006

(65) Prior Publication Data

US 2007/0110201 A1 May 17, 2007

Related U.S. Application Data

(60) Provisional application No. 60/737,256, filed on Nov. 15, 2005.

(51) Int. Cl.
*H04B 1/10* (2006.01)
(52) U.S. Cl. .................. 375/350; 455/307; 708/300
(58) Field of Classification Search .............. 375/350; 455/307; 708/300
See application file for complete search history.

(56) References Cited

U.S. PATENT DOCUMENTS

| | | | | |
|---|---|---|---|---|
| 4,243,935 A | * | 1/1981 | McCool et al. | 324/76.35 |
| 5,461,426 A | * | 10/1995 | Limberg et al. | 348/475 |
| 5,513,221 A | * | 4/1996 | Parr et al. | 375/344 |
| 5,557,646 A | * | 9/1996 | Honma | 375/346 |
| 5,825,832 A | * | 10/1998 | Benedetto | 375/341 |
| 6,209,014 B1 | * | 3/2001 | Prasad | 708/322 |
| 7,065,371 B1 | * | 6/2006 | Kleinerman | 455/464 |
| 7,433,402 B2 | * | 10/2008 | Al-Dhahir et al. | 375/233 |
| 7,505,537 B1 | * | 3/2009 | Sutardja | 375/345 |
| 2003/0072277 A1 | * | 4/2003 | Subrahmanya et al. | 370/320 |
| 2005/0047802 A1 | * | 3/2005 | Jaynes et al. | 398/208 |
| 2006/0023799 A1 | * | 2/2006 | Kang et al. | 375/260 |

(Continued)

OTHER PUBLICATIONS

Rao, "Adaptive notch filtering for the retrieval of sinusoids in noise", IEEE Transactions on Acoustics, Speech and Signal Processing, vol. 32, Issue 4, Aug. 1984 pp. 791-802.*

(Continued)

*Primary Examiner*—Juan A Torres
(74) *Attorney, Agent, or Firm*—Howard Seo; Larry J. Moskowitz

(57) ABSTRACT

Techniques for filtering noisy estimates to reduce estimation errors are described. A sequence of input values (e.g., for an initial channel impulse response estimate (CIRE)) is filtered with an infinite impulse response (IIR) filter having at least one coefficient to obtain a sequence of output values (e.g., for a filtered CIRE). The coefficient(s) are updated based on the sequence of input values with an adaptive filter, a bank of prediction filters, or a normalized variation technique. To update the coefficient(s) with the adaptive filter, a sequence of predicted values is derived based on the sequence of input values. Prediction errors between the sequence of predicted values and the sequence of input values are determined and filtered to obtain filtered prediction errors. The coefficient(s) of the IIR filter are then updated based on the prediction errors and the filtered prediction errors.

13 Claims, 10 Drawing Sheets

U.S. PATENT DOCUMENTS

2006/0251198 A1* 11/2006 Ma et al. .................... 375/350
2007/0098090 A1*  5/2007 Ma et al. .................... 375/260

OTHER PUBLICATIONS

Ozcelik, "Recursive quadratically constrained least squares bias-free IIR system identification via variable loading", The 2002 45th Midwest Symposium on Circuits and Systems, 2002, MWSCAS-2002, vol. 3, Aug. 4-7, 2002 pp. III-660-III-663 vol. 3.*

Shen, Q. et al: "The Linear Prediction Method of Fading Channel Estimation for the Rake Receiver with Impulsive Interference" Wireless Personal Communications, Springer, Dordrecht, NL, vol. 6, No. 3, Mar. 1, 1998, pp. 233-248.

* cited by examiner

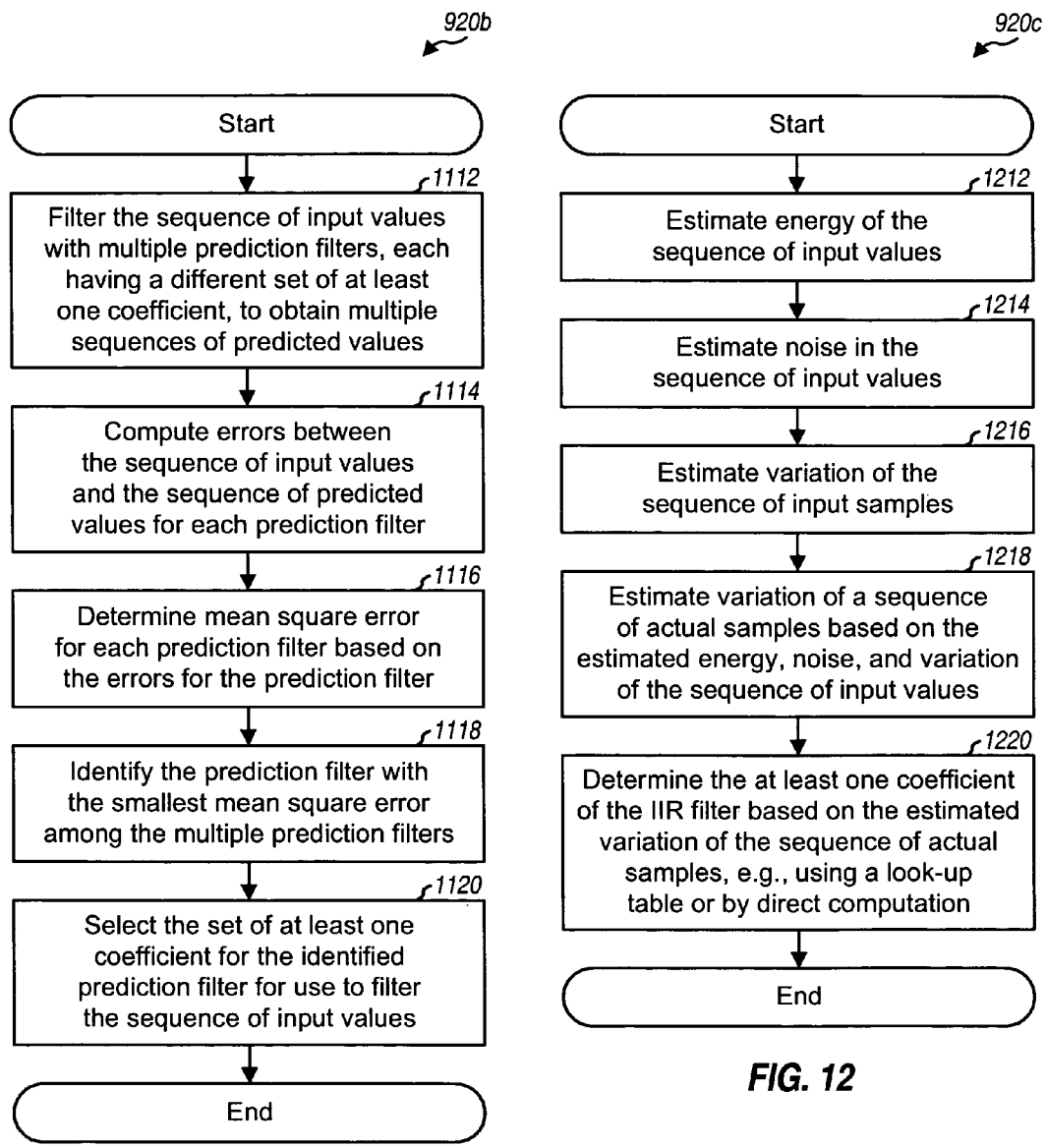

METHOD AND APPARATUS FOR FILTERING NOISY ESTIMATES TO REDUCE ESTIMATION ERRORS

The present application claims priority to provisional U.S. Application Ser. No. 60/737,256, entitled "Prediction Based Optimal Adaptation of Pilot Filter Coefficients for Improved Channel Estimation," filed Nov. 15, 2005, assigned to the assignee hereof and incorporated herein by reference.

BACKGROUND

I. Field

The present disclosure relates generally to communication, and more specifically to filtering techniques.

II. Background

In a wireless communication system, a transmitter typically processes (e.g., encodes and modulates) traffic data to generate data symbols. For a coherent system, the transmitter multiplexes pilot symbols with the data symbols, processes the multiplexed data and pilot symbols to generate a radio frequency (RF) signal, and transmits the RF signal via a wireless channel. The wireless channel distorts the transmitted RF signal with a channel response and further degrades the signal with noise and interference.

A receiver receives the transmitted RF signal and processes the received RF signal to obtain samples. For coherent data detection, the receiver estimates the response of the wireless channel based on the received pilot and derives a channel estimate. The receiver then performs data detection (e.g., equalization) on the samples with the channel estimate to obtain symbol estimates, which are estimates of the data symbols sent by the transmitter. The receiver then processes (e.g., demodulates and decodes) the symbol estimates to obtain decoded data.

The quality of the channel estimate may have a large impact on data detection performance and may affect the quality of the symbol estimates as well as the reliability of the decoded data. There is therefore a need in the art for techniques to derive a high quality channel estimate in a wireless communication system.

SUMMARY

Techniques for filtering noisy estimates to reduce estimation errors and obtain higher quality estimates are described herein. These techniques may be used for various applications, and the noisy estimates may be any scalar, vector, or matrix. One exemplary application of the techniques is for filtering noisy estimates of a channel impulse response (CIR), which is a time-domain response of a communication channel.

In an embodiment, a sequence of input values is filtered with an infinite impulse response (IIR) filter having at least one coefficient to obtain a sequence of output values. The sequence of input values may be for an initial channel impulse response estimate (CIRE), and the sequence of output values may be for a filtered CIRE. The coefficient(s) of the IIR filter are updated based on the sequence of input values using one of the update techniques described herein. The IIR filter may have a single coefficient that is referred to as alpha.

In an embodiment, the coefficient(s) of the IIR filter are updated based on an adaptive filter. In this embodiment, a sequence of predicted values is derived based on the sequence of input values, and may be equal to a delayed version of the sequence of output values. Prediction errors between the sequence of predicted values and the sequence of input values are determined and filtered (e.g., with the coefficient(s) of the IIR filter) to obtain filtered prediction errors. The coefficient(s) of the IIR filter are then updated based on the prediction errors and the filtered prediction errors.

In another embodiment, the coefficient(s) of the IIR filter are updated based on a bank of prediction filters. In this embodiment, the sequence of input values is filtered with multiple prediction filters to obtain multiple sequences of predicted values. Each prediction filter has a different set of at least one coefficient. The prediction filter with the smallest prediction error among the multiple prediction filters is identified. The set of coefficient(s) for the identified prediction filter is selected for use to filter the sequence of input values.

In yet another embodiment, the coefficient(s) of the IIR filter are updated based on a normalized variation technique. In this embodiment, variation of a sequence of actual samples (e.g., the CIR) is estimated based on the sequence of input values. This may be achieved by estimating the energy of the sequence of input values, estimating the noise in the sequence of input values, and estimating the variation of the sequence of input samples. The variation of the sequence of actual samples may then be estimated based on the estimated energy, estimated noise, and estimated variation of the sequence of input values. The coefficient(s) of the IIR filter are determined based on the estimated variation of the sequence of actual samples, e.g., using a look-up table or by direct calculation.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 10, 11 and 12 show processes for updating alpha based on an adaptive filter, a bank of prediction filters, and the normalized variation technique, respectively.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
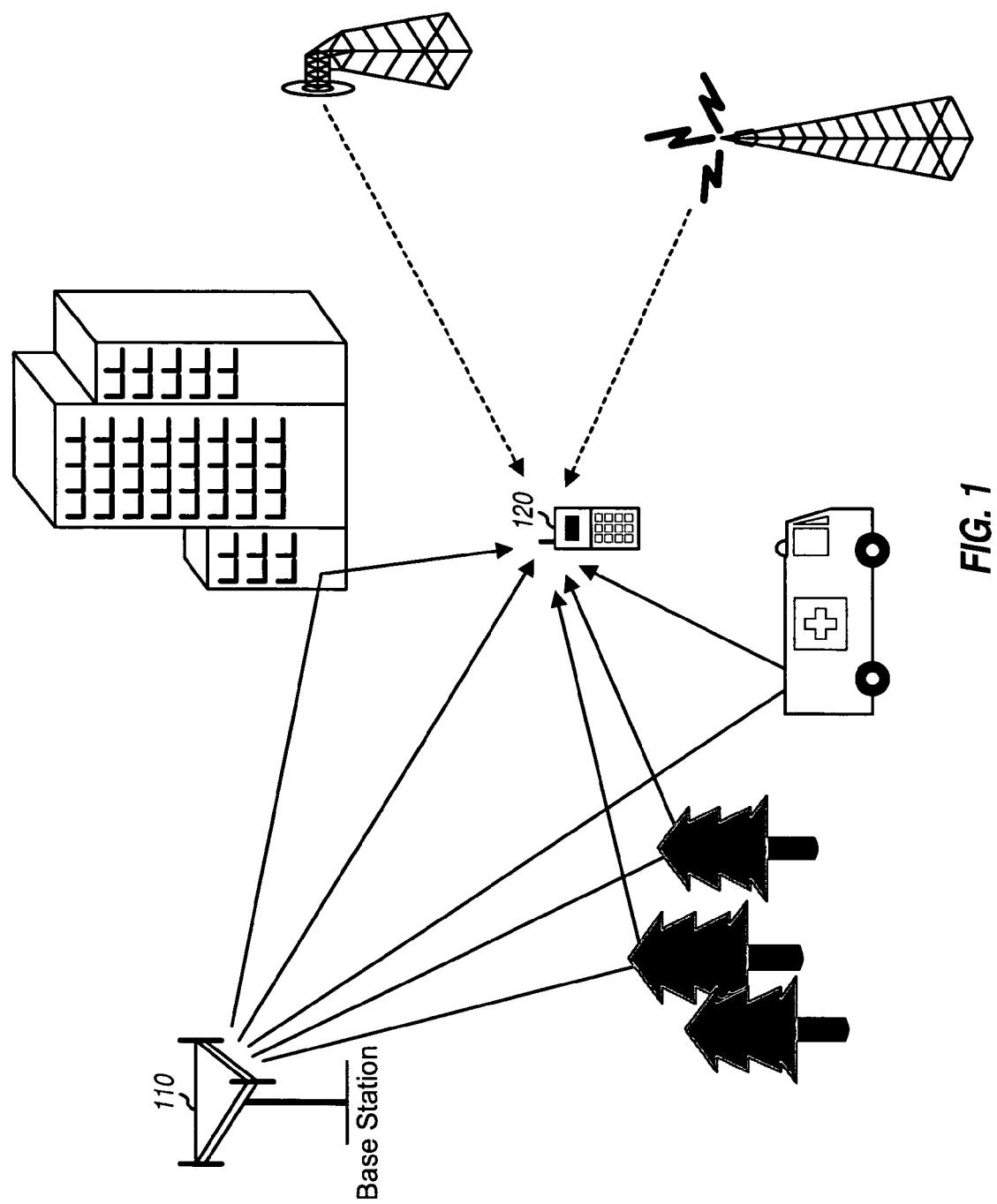
FIG. 1 shows a transmission in a wireless communication system.

FIG. 1 shows an exemplary transmission in a wireless communication system. For simplicity, FIG. 1 shows only one base station 110 and one wireless device 120. A base station is generally a fixed station that communicates with the wireless devices and may also be called a Node B, an access point, a base transceiver station (BTS), or some other terminology. A wireless device may be fixed or mobile and may also be called a user equipment (UE), a mobile station, a user terminal, a subscriber unit, or some other terminology. A wireless device may be a cellular phone, a personal digital assistant (PDA), a wireless modem card, a handheld device, or some other device or apparatus.

Base station 110 transmits an RF signal to wireless device 120. This RF signal may reach wireless device 120 via one or more signal paths, which may include a direct path and/or reflected paths. The reflected paths are created by reflections of radio waves due to obstructions (e.g., buildings, trees, vehicles, and other structures) in the wireless environment. Wireless device 120 may receive multiple instances or copies of the transmitted RF signal. Each received signal instance is obtained via a different signal path and has a particular complex gain and a particular time delay determined by that signal path. The received RF signal at wireless device 120 is a superposition of all of the received signal instances. Wireless device 120 may also receive interfering transmissions from other transmitting stations, which are shown by dashed lines in FIG. 1.

The filtering techniques described herein may be used for various communication systems such as a Code Division Multiple Access (CDMA) system, a Time Division Multiple Access (TDMA) system, a Frequency Division Multiple Access (FDMA) system, an Orthogonal Frequency Division Multiple Access (OFDMA) system, a Single-Carrier FDMA (SC-FDMA) system, and so on. A CDMA system may implement one or more radio technologies such as Wideband-CDMA (W-CDMA), cdma2000, and so on. cdma2000 covers IS-2000, IS-856 and IS-95 standards. A TDMA system may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system transmits modulation symbols in the frequency domain on orthogonal subcarriers using OFDM. An SC-FDMA system transmits modulation symbols in the time domain on orthogonal subcarriers.

The filtering techniques described herein may be used for a wireless device as well as a base station. For clarity, these techniques are described below for a wireless device in a CDMA system, which may be a W-CDMA system or a cdma2000 system.

Figure 2:
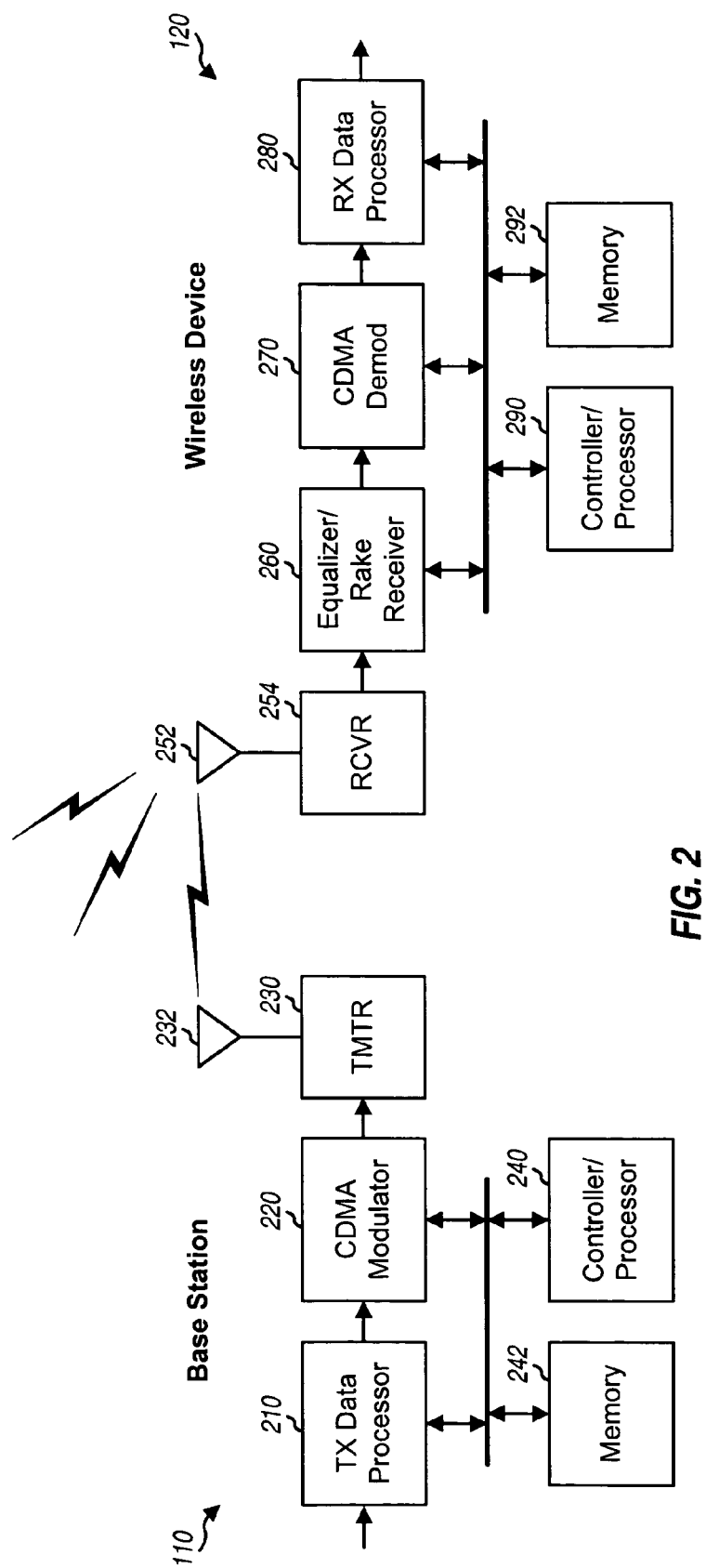
FIG. 2 shows a block diagram of a base station and a wireless device.

FIG. 2 shows a block diagram of base station 110 and wireless device 120. At base station 110, a transmit (TX) data processor 210 receives traffic data for the wireless devices being served and processes (e.g., encodes, interleaves, and symbol maps) the traffic data to generate data symbols. As used herein, a data symbol is a modulation symbol for data, a pilot symbol is a modulation symbol for pilot, a modulation symbol is a complex value for a point in a signal constellation (e.g., for M-PSK or M-QAM), and pilot is data that is known a priori by both the base station and the wireless device. A CDMA modulator 220 processes the data symbols and pilot symbols and provides output chips to a transmitter (TMTR) 230. Transmitter 230 processes (e.g., converts to analog, amplifies, filters, and frequency upconverts) the output chips and generates an RF signal, which is transmitted from an antenna 232.

At wireless device 120, an antenna 252 receives the transmitted RF signal via direct and/or reflected paths and provides a received RF signal to a receiver (RCVR) 254. Receiver 254 processes (e.g., filters, amplifies, frequency downconverts, and digitizes) the received RF signal to obtain received samples. Receiver 254 may perform pre-processing on the received samples and provide input samples to an equalizer/rake receiver 260. The pre-processing may include, e.g., automatic gain control (AGC), frequency correction, digital filtering, sample rate conversion, and so on. Equalizer/rake receiver 260 processes the input samples (e.g., with an equalizer or a rake receiver) and provides output samples. A CDMA demodulator (Demod) 270 processes the output samples in a manner complementary to the processing by CDMA modulator 220 and provides symbol estimates, which are estimates of the data symbols sent by base station 110 to wireless device 120. The rake receiver and CDMA demodulator may also be combined. A receive (RX) data processor 280 processes (e.g., symbol demaps, deinterleaves, and decodes) the symbol estimates and provides decoded data. In general, the processing by CDMA demodulator 270 and RX data processor 280 is complementary to the processing by CDMA modulator 220 and TX data processor 210, respectively, at base station 110.

Controllers/processors 240 and 290 direct operation of various processing units at base station 110 and wireless device 120, respectively. Memories 242 and 292 store data and program codes for base station 110 and wireless device 120, respectively.

At wireless device 120, the input samples from receiver 254 may be expressed as:

$$y(k) = h(k) \otimes [x(k) + p(k)] + w(k), \quad \text{Eq (1)}$$
$$= \sum_{i=-\infty}^{\infty} h(i) \cdot [x(k-i) + p(k-i)] + w(k),$$

where
  x(k) is a signal component of interest for wireless device 120,
  p(k) is the pilot from base station 110,
  h(k) is a time-domain impulse response of the wireless channel between base station 110 and wireless device 120,
  w(k) is the total noise and interference observed by x(k) and p(k),
  y(k) is the input samples at wireless device 120, and
  $\otimes$ denotes a convolution.

In equation (1), x(k) may be the signal component for a physical channel of interest to wireless device 120. w(k) may include signal components for other physical channels from base station 110, noise from various sources, and interference from other transmitting stations. For simplicity, w(k) is assumed to be additive white Gaussian noise (AWGN) with zero mean and a variance of $\sigma^2$. The input samples y(k) may be processed with an equalizer to obtain an estimate of the desired signal x(k).

Figure 3:
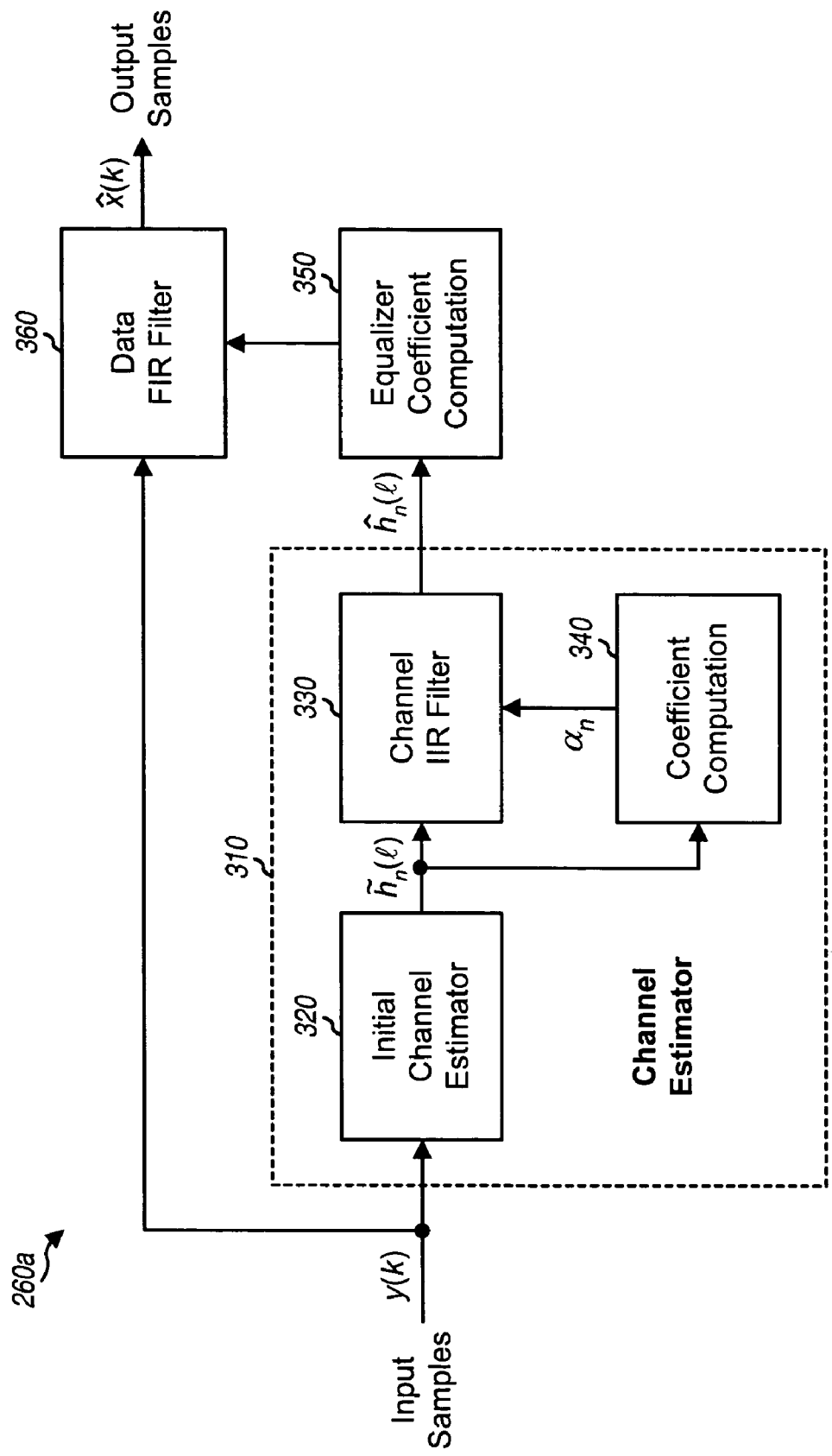
FIG. 3 shows a block diagram of an equalizer at the wireless device.

FIG. 3 shows a block diagram of an equalizer 260a, which is an embodiment of equalizer/rake receiver 260 in FIG. 2. In this embodiment, the input samples y(k) from receiver 254 are provided to a channel estimator 310 and a data finite impulse response (FIR) filter 360. Channel estimator 310 derives a channel impulse response estimate (CIRE) $\hat{h}_n(l)$ for the wireless channel between base station 110 and wireless device 120. A computation unit 350 receives the CIRE $\hat{h}_n(l)$ and derives equalizer coefficients based on this CIRE and using, e.g., linear minimum mean square error (LMMSE), least mean square (LMS), recursive least square (RLS), direct matrix inversion (DMI), zero-forcing, or some other technique. FIR filter 360 filters the input samples y(k) with the equalizer coefficients and provides output samples x̂(k), which are estimates of the desired signal x(k).

The time-domain channel impulse response (CIR) between base station 110 and wireless device 120 may be considered as having L channel taps h(1) through h(L), where L may be any value, e.g., L=64. Each channel tap h(l), for l=1, . . . , L, has a particular complex gain and a particular time delay, both of which are determined by the wireless environment. The CIR may be given in vector form as follows:

$$\underline{h}_n = [h_n(1) h_n(2) \ldots h_n(L)]^T, \quad \text{Eq (2)}$$

where $\underline{h}_n$ is an L×1 vector for the CIR in time interval n, and "$T$" denotes a transpose.

Wireless device 120 attempts to derive accurate estimates of the L channel taps in the CIR. Within channel estimator 310, an initial channel estimator 320 derives an initial CIRE based on the pilot received from base station 110. In an embodiment, the initial CIRE may be derived as:

$$\tilde{h}_n(l) = \frac{1}{K} \cdot \sum_{i=0}^{K-1} y(n \cdot K + l - 1 + i) \cdot p^*(i), \text{ for } l = 1, \ldots, L, \quad \text{Eq (3)}$$

where
$\tilde{h}_n(l)$ is an initial estimate of channel tap h(l) in time interval n,
K is the accumulation length, and
"*" denotes a complex conjugate.

The "l−1" in equation (3) is due to index l starting at 1 instead of 0.

In equation (3), channel tap h(l) is estimated by despreading the input samples y(k) in the time domain with the pilot sequence p(k) at a time offset of l−1. L different channel taps may be estimated with L different time offsets. The despreading for each time offset may be achieved by multiplying the input samples y(k) for that time offset with the complex conjugated pilot chips p*(k) and accumulating the results over K chips. K is an integer multiple of the length of an orthogonal code used for the pilot. The pilot orthogonal code is 256 chips long in W-CDMA and 128 chips long in cdma2000. K may be equal to one pilot symbol, multiple pilot symbols, one slot, multiple slots, one frame, or some other duration. A slot covers 2560 chips and 10 pilot symbols in W-CDMA and covers 768 chips and 6 pilot symbols in cdma2000.

An initial CIRE may be derived for each time interval n. A time interval may be a slot, a frame, or some other time duration. The initial CIRE is composed of L channel tap estimates and may be given as $\underline{\tilde{h}}_n = [\tilde{h}_n(1) \ \tilde{h}_n(2) \ \ldots \ \tilde{h}_n(L)]^T$. The initial CIRE contains estimation errors and noise and may be filtered across multiple time intervals to reduce the estimation errors and noise.

In an embodiment that is shown in FIG. 3, a channel IIR filter 330 filters the initial CIRE, as follows:

$$\underline{\hat{h}}_n = \alpha_n \cdot \underline{\tilde{h}}_n + (1 - \alpha_n) \cdot \underline{\hat{h}}_{n-1}, \quad \text{Eq (4)}$$

where $\underline{\hat{h}}_n = [\hat{h}_n(1) \hat{h}_n(2) \ldots \hat{h}_n(L)]^T$ is an L×1 vector for the filtered CIRE in time interval n, and
$\alpha_n$ is a coefficient for time interval n.

The IIR filtering in equation (4) is performed separately for each of the L channel taps. A coefficient computation unit 340 derives the coefficient $\alpha_n$ for IIR filter 330.

Figure 4:
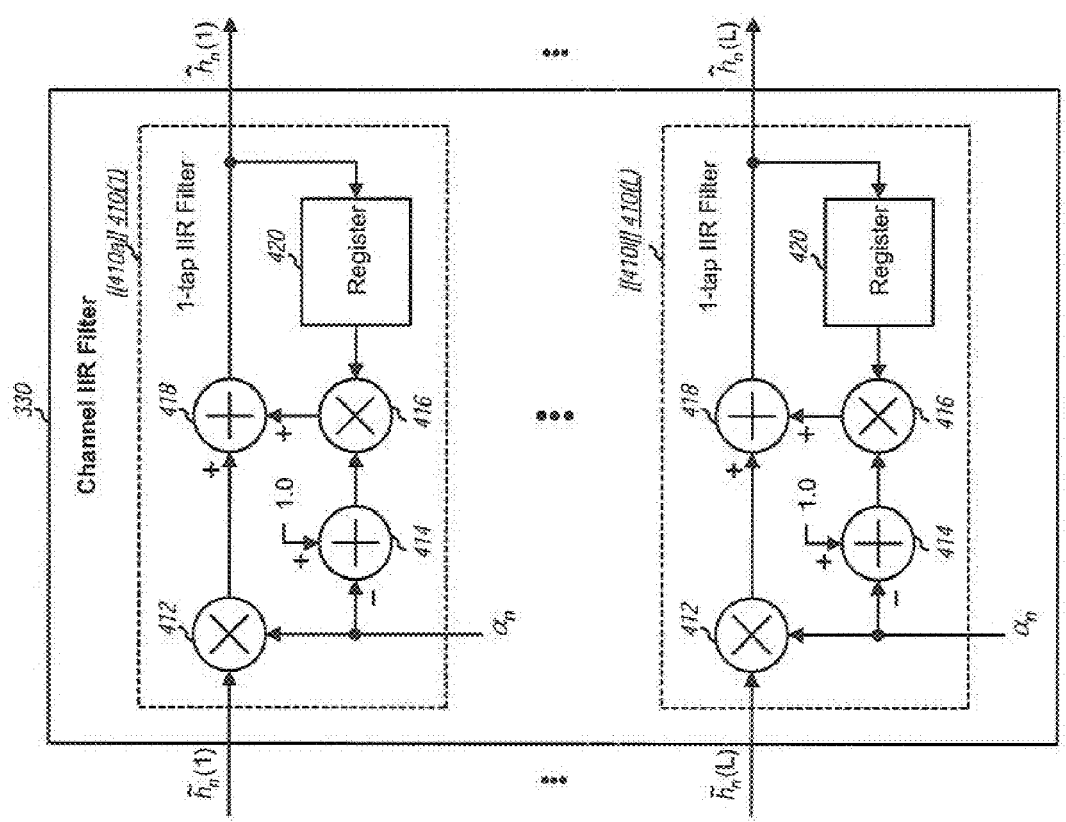
FIG. 4 shows a block diagram of a channel IIR filter.

FIG. 4 shows a block diagram of an embodiment of channel IIR filter 330 in FIG. 3. In this embodiment, channel IIR filter 330 includes L 1-tap IIR filters 410(1) through 410(L) for the L channel taps. Each IIR filter 410 performs filtering for one tap index. Within the 1-tap IIR filter for tap index l, where l∈{1, . . . , L}, a multiplier 412 receives and multiplies an initial channel tap estimate $\tilde{h}_n(l)$ with coefficient $\alpha_n$. A summer 414 subtracts coefficient $\alpha_n$ from 1.0 and provides (1−$\alpha_n$). A multiplier 416 multiplies a delayed channel tap estimate $\hat{h}_{n-1}(l)$ from a register 420 with (1−$\alpha_n$). A summer 418 sums the outputs of multipliers 412 and 416 and provides a filtered channel tap estimate $\hat{h}_n(l)$. Register 420 stores filtered channel tap estimate $\hat{h}_n(l)$ for use in the next time interval.

The filtering in equation (4) reduces noise and improves estimation accuracy. Hence, the filtered CIRE $\underline{\hat{h}}_n$ is generally an improved estimate of the CIR $\underline{h}_n$. Coefficient $\alpha_n$ determines the amount of filtering. In general, 1>$\alpha_n$>0, with a larger $\alpha_n$ corresponding to less filtering, and vice versa. In the following description, coefficient $\alpha_n$ is referred to as alpha.

It can be shown that improved performance may be achieved with different amounts of filtering for the initial CIRE in different operating scenarios. A good value for alpha may be dependent on speed, received signal quality, and possibly other factors.

Figure 5:
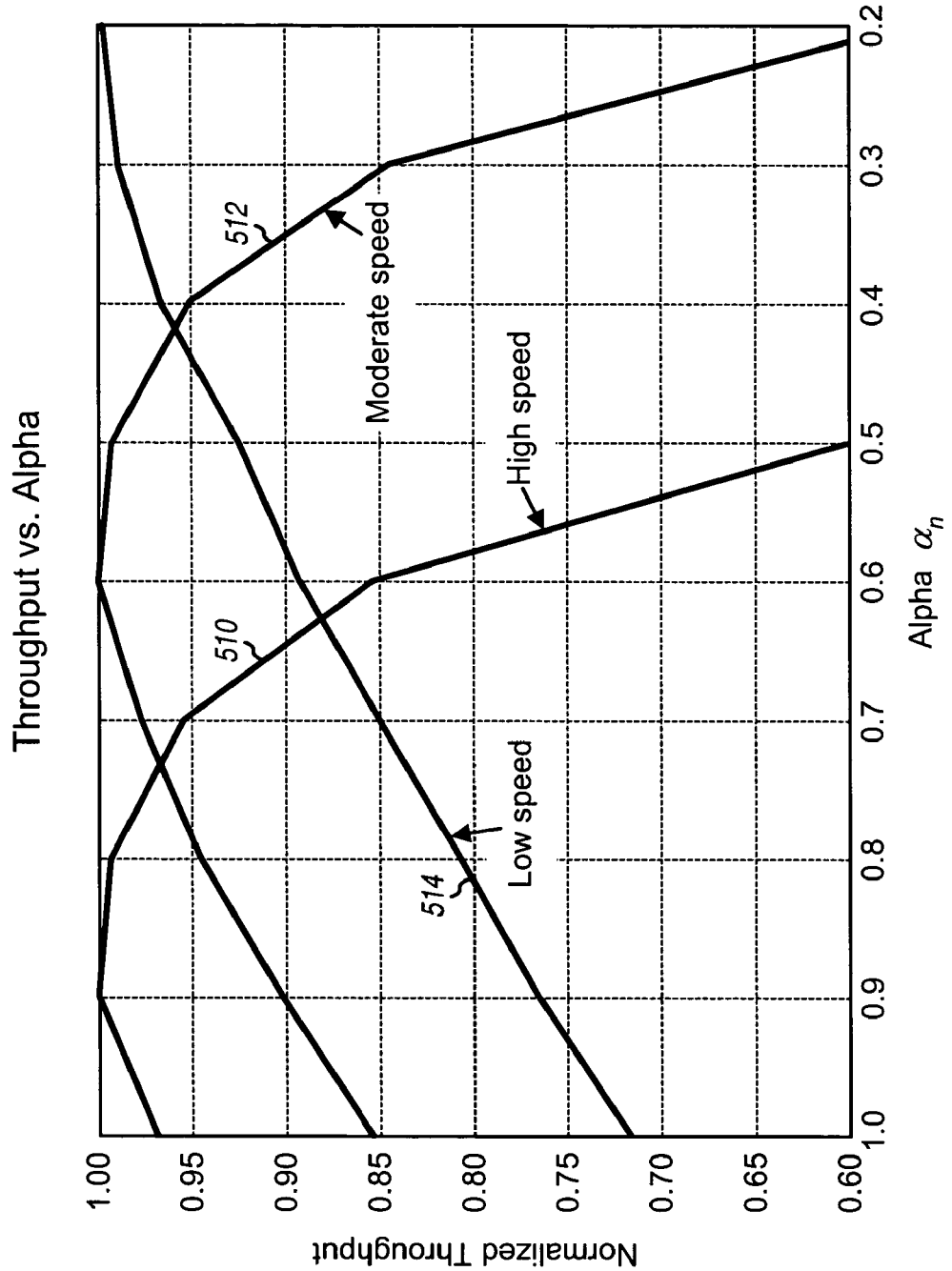
FIG. 5 shows plots of throughput versus alpha for three speed scenarios.

FIG. 5 shows plots of throughput versus alpha for three different speed scenarios. A plot 510 shows throughput versus alpha for a high-speed scenario of 120 km/hr, a plot 512 shows throughput versus alpha for a moderate-speed scenario of 30 km/hr, and a plot 514 shows throughput versus alpha for a low-speed scenario of 3 km/hr. These plots indicate that the highest throughput may be achieved with alpha between 0.8 to 1.0 for the high-speed scenario, between 0.5 to 0.7 for the moderate-speed scenario, and between 0.2 and 0.3 for the low-speed scenario.

FIG. 5 indicates that a good choice of alpha depends on mobility. A smaller alpha (more filtering) is better for a slowly varying channel whereas a larger alpha (less filtering) is better for a fast changing channel. It can be shown that a good choice of alpha also depends on received signal quality. For a given speed, a smaller alpha (more filtering) is better for low received signal quality whereas a larger alpha (less filtering) is better for high received signal quality. As suggested by the plots in FIG. 5, performance may degrade significantly if an inappropriate value is used for alpha.

The filtering techniques described herein may reduce estimation errors and provide good performance for various operating scenarios. These techniques include prediction-based techniques and a normalized variation technique. The prediction-based techniques may be implemented with an adaptive filter or a bank of prediction filters.

In an embodiment of the prediction-based techniques, alpha is updated in small steps with an adaptive filter. In an embodiment, the IIR filter in equation (4) is also used as a prediction filter that predicts the channel taps for the next time interval. Hence, in time interval n−1, the filtered CIRE $\underline{\hat{h}}_{n-1}$ generated by the IIR filter is used as the predicted CIRE for time interval n Prediction errors between the initial CIRE and the predicted CIRE may be expressed as:

$$\underline{e}_n = \underline{\tilde{h}}_n - \underline{\hat{h}}_{n-1}, \quad \text{Eq (5)}$$

where $\underline{e}_n=[e_n(1)e_n(2) \ldots e_n(L)]^T$ is an L×1 vector of prediction errors for the L predicted channel taps in time interval n.

Alpha may be adaptively updated in each time interval n as follows:

$$\alpha_{n+1} = \alpha_n - \chi \cdot \frac{\partial \|\underline{e}_n\|^2}{\partial \alpha}, \quad \text{Eq (6)}$$

where $\|\underline{e}_n\|^2$ is the norm square of the prediction error vector, and $\chi$ is a coefficient that determines the rate of adaptation for alpha.

Equation (6) updates alpha to minimize the norm square of the prediction errors to achieve minimum mean square error (MMSE). The partial derivative term $\partial \|\underline{e}_n\|^2/\partial \alpha$ a is indicative of an error gradient. Alpha is updated based on, and in the opposite direction of, the gradient of the norm square prediction error. The speed of adaptation is determined by coefficient $\chi$, which may be selected to provide good performance. Coefficient $\chi$ may be set to 0.01 or some other value.

The partial derivative term in equation (6) may be expressed as:

$$\frac{\partial \|\underline{e}_n\|^2}{\partial \alpha} = -2\operatorname{Re}\left\{\underline{e}_n^H \cdot \frac{\partial \underline{\hat{h}}_{n-1}}{\partial \alpha}\right\} \quad \text{Eq (7)}$$
$$= -2\operatorname{Re}\{\underline{e}_n^H \cdot \underline{f}_n\},$$

where "$^H$" denotes a conjugate transpose.

The term $\partial \underline{\hat{h}}_{n-1}/\partial \alpha$ in equation (7) may be expressed as:

$$\frac{\partial \underline{\hat{h}}_{n-1}}{\partial \alpha} = \underline{f}_n = \underline{e}_{n-1} + (1-\alpha_n) \cdot \underline{f}_{n-1}, \quad \text{Eq (8)}$$

where $\underline{f}_n=[f_n(1)f_n(2) \ldots f_n(L)]^T$ is an L×1 vector of filtered prediction errors for the L channel taps in time interval n.

Equation (7) indicates that the term $\partial \underline{\hat{h}}_{n-1}/\partial \alpha$ may be derived based on the prediction errors $\underline{e}_n$ computed in the current time interval n and the filtered prediction errors $\underline{f}_n$ for the current time interval n.

The partial derivative term in equation (6) may then be expressed as:

$$\frac{\partial \|\underline{e}_n\|^2}{\partial \alpha} = -2 \cdot \sum_{\ell=1}^{L} \operatorname{Re}\{e_n^*(l) \cdot f_n(l)\}. \quad \text{Eq (9)}$$

Alpha may then be updated as:

$$\alpha_{n+1} = \alpha_n + 2\chi \cdot \sum_{\ell=1}^{L} \operatorname{Re}\{e_n^*(l) \cdot f_n(l)\}. \quad \text{Eq (10)}$$

In the embodiment shown in equations (6) through (10), a single alpha is used for all L channel taps, and this alpha is updated based on all L channel taps. In another embodiment, a separate alpha is used for each channel tap and may be updated based on the prediction error for that channel tap, as follows:

$$\alpha_{n+1}(l) = \alpha_n(l) - \chi \cdot \frac{\partial |e_n(l)|^2}{\partial \alpha},$$

$$\frac{\partial |e_n(l)|^2}{\partial \alpha} = -2\operatorname{Re}\left\{e_n^*(l) \cdot \frac{\partial \hat{h}_{n-1}(l)}{\partial \alpha}\right\}$$
$$= -2\operatorname{Re}\{e_n^*(l) \cdot f_n(l)\}, \text{ and}$$

$$\frac{\partial \hat{h}_{n-1}(l)}{\partial \alpha} = f_n(l) = e_{n-1}(l) + (1-\alpha_n(l)) \cdot f_{n-1}(l).$$

Alpha may be updated based on an adaptive filter as follows. Initially, the filtered CIRE $\underline{\hat{h}}_{n-1}$ and the filtered prediction errors $\underline{f}_n$ are initialized to zero. Alpha may be initialized to a value that provides good performance for most operating scenarios, e.g., $\alpha_n=0.6$. Thereafter, alpha may be updated in each time interval n as follows:

1. Obtain an initial CIRE $\underline{\tilde{h}}_n$, e.g., as shown in equation (3),
2. Compute the prediction errors $\underline{e}_n$ as shown in equation (5),
3. Compute the partial derivative term $\partial \|\underline{e}_n\|^2/\partial \alpha$ based on the prediction errors $\underline{e}_n$ and the filtered prediction errors $\underline{f}_n$, as shown in equation (9),
4. Update alpha based on the partial derivative term and the step size $\chi$, as shown in equation (10), and
5. Update the filtered prediction errors based on the prediction errors $\underline{e}_n$ and the updated alpha $\alpha_{n+1}$, as shown in equation (8).

The updated alpha $\alpha_{n+1}$ may be used to filter the initial CIRE in the next time interval.

Figure 6:
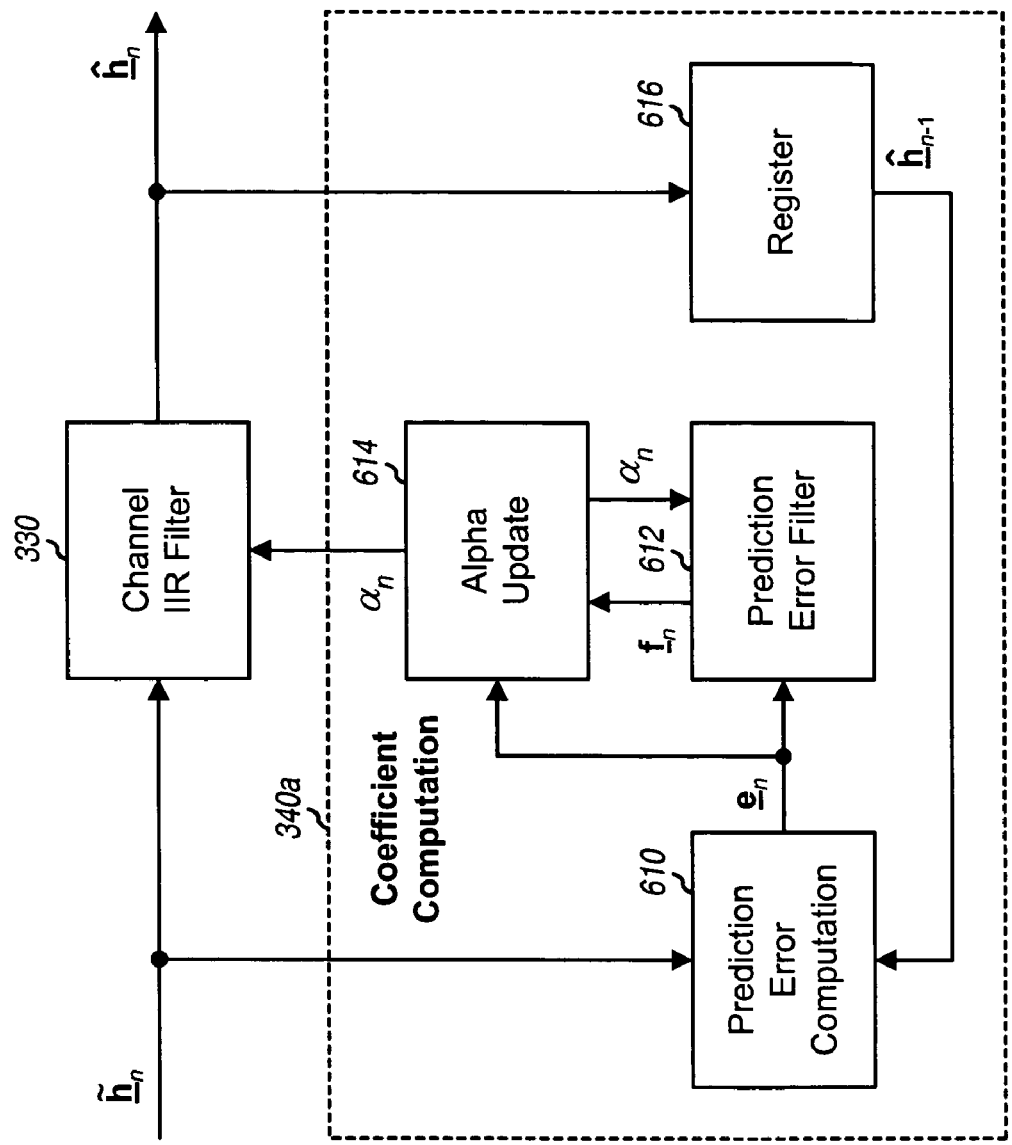
FIGS. 6, 7 and 8 show units that update alpha based on an adaptive filter, a bank of prediction filters, and the normalized variation technique, respectively.

FIG. 6 shows an embodiment of a coefficient computation unit 340a that updates alpha with an adaptive filter. Channel IIR filter 330 filters the initial CIRE $\underline{\tilde{h}}_n$ with the current alpha $\alpha_n$ and provides the filtered CIRE $\underline{\hat{h}}_n$. Within unit 340a, a prediction error computation unit 610 receives the initial CIRE $\underline{\tilde{h}}_n$ and the predicted CIRE $\underline{\hat{h}}_{n-1}$ from a register 616. Unit 610 computes the prediction errors $\underline{e}_n$ as shown in equation (5). An alpha update unit 614 receives the prediction errors $\underline{e}_n$ and the filtered prediction errors $\underline{f}_n$, updates the alpha as shown in equations (9) and (10), and provides the updated alpha $\alpha_{n+1}$ for the next time interval. A filter 612 filters the prediction errors $\underline{e}_n$ as shown in equation (8) and provides the filtered prediction errors for the next time interval. Register 616 receives and stores the filtered CIRE $\underline{\hat{h}}_n$, which is used as the predicted CIRE for the next time interval.

The use of an adaptive filter to update alpha may provide various advantages. First, the filtered CIRE, the filtered prediction errors, and alpha may be derived with relatively small amounts of computation and memory. Second, fast convergence rate may be achieved since the filtered prediction errors are obtained based on a variable IIR filter, as shown in equation (8). Third, the adaptation speed may be controlled by selecting a suitable value for coefficient $\chi$.

In another embodiment of the prediction-based techniques, alpha is selected from among a bank of prediction filters with different alphas. In this embodiment, the initial CIRE may be filtered with M different prediction filters, as follows:

$$\underline{\hat{h}}_n^{(m)} = \alpha^{(m)} \cdot \underline{\tilde{h}}_n + (1-\alpha^{(m)}) \cdot \underline{\hat{h}}_{n-1}^{(m)}, \text{ for } m=1,\ldots,M, \quad \text{Eq (11)}$$

where $\underline{\hat{h}}_n^{(m)} = [\hat{h}_n^{(m)}(1)\ \hat{h}_n^{(m)}(2) \ldots \hat{h}_n^{(m)}(L)]^T$ is an L×1 vector for the predicted CIRE from prediction filter m in time interval n, and $\alpha^{(m)}$ is the alpha for prediction filter m.

M different alphas may be used for the M prediction filters, where in general M>1. In an embodiment, the M alphas are evenly distributed from 0 to 1, e.g., $\alpha^{(m)} = m/M$. For example, M may be equal to 10, and 10 prediction filters may be implemented with 10 equally spaced alphas of 0.1, 0.2, ..., 1.0. The M alphas may also be set to other values, e.g., more concentrated in certain ranges where the wireless device is expected to operate.

The prediction errors for each prediction filter may be expressed as:

$$\underline{e}_n^{(m)} = \underline{\hat{h}}_n - \underline{\hat{h}}_{n-1}^{(m)}, \text{ for } m=1, \ldots, M, \quad \text{Eq (12)}$$

where $\underline{e}_n^{(m)} = [e_n^{(m)}(1)\ e_n^{(m)}(2) \ldots e_n^{(m)}(L)]^T$ is an L×1 vector of prediction errors for prediction filter m in time interval n.

In each time interval n, one of the M alphas may be selected for use, as follows:

$$m_n = \min_{m=1,\ldots,M} \mathcal{E}\{\|\underline{e}_n^{(m)}\|^2\}, \quad \text{Eq (13)}$$

$$\alpha_{n+1} = \alpha^{(m_n)}, \quad \text{Eq (14)}$$

where $\mathcal{E}\{\ \}$ denotes an expectation operation, $\mathcal{E}\{\|\underline{e}_n^{(m)}\|^2\}$ is a prediction mean square error (MSE) for prediction filter m, and $m_n$ is the index of the prediction filter with the minimum prediction MSE.

In equation (13), the prediction filter that gives the minimum prediction MSE for all L channel taps is selected. In equation (14), the alpha for the selected prediction filter is provided as the alpha used to filter the initial CIRE.

The prediction MSE may be estimated for each prediction filter m, as follows:

$$MSE_n^{(m)} = \eta \cdot \sum_{l=1}^{L} |e_n^{(m)}(l)|^2 + (1-\eta) \cdot MSE_{n-1}^{(m)}, \quad \text{Eq (15)}$$

where $MSE_n^{(m)}$ is an estimated prediction MSE for prediction filter m in time interval n, and $\eta$ is a coefficient that determines the amount of averaging for the prediction MSE.

Coefficient $\eta$ may be set to 0.05 or some other value.

Alpha may be derived based on a bank of prediction filters as follows. Initially, the predicted CIRE $\underline{\hat{h}}_{n-1}^{(m)}$ and the estimated prediction MSE, $MSE_{n-1}^{(m)}$, for each of the M prediction filters are initialized to zero. Thereafter, alpha may be selected in each time interval n as follows:

1. Obtain an initial CIRE $\underline{\hat{h}}_n$, e.g., as shown in equation (3),
2. Compute the prediction errors $\underline{e}_n^{(m)}$ for each prediction filter, as shown in equation (12),
3. Compute the estimated prediction MSE, $MSE_n^{(m)}$, for each prediction filter based on its prediction errors $\underline{e}_n^{(m)}$, as shown in equation (15),
4. Select the alpha of the prediction filter with the smallest estimated prediction MSE, as shown in equations (13) and (14), and
5. Update each prediction filter as shown in equation (11).

Figure 7:
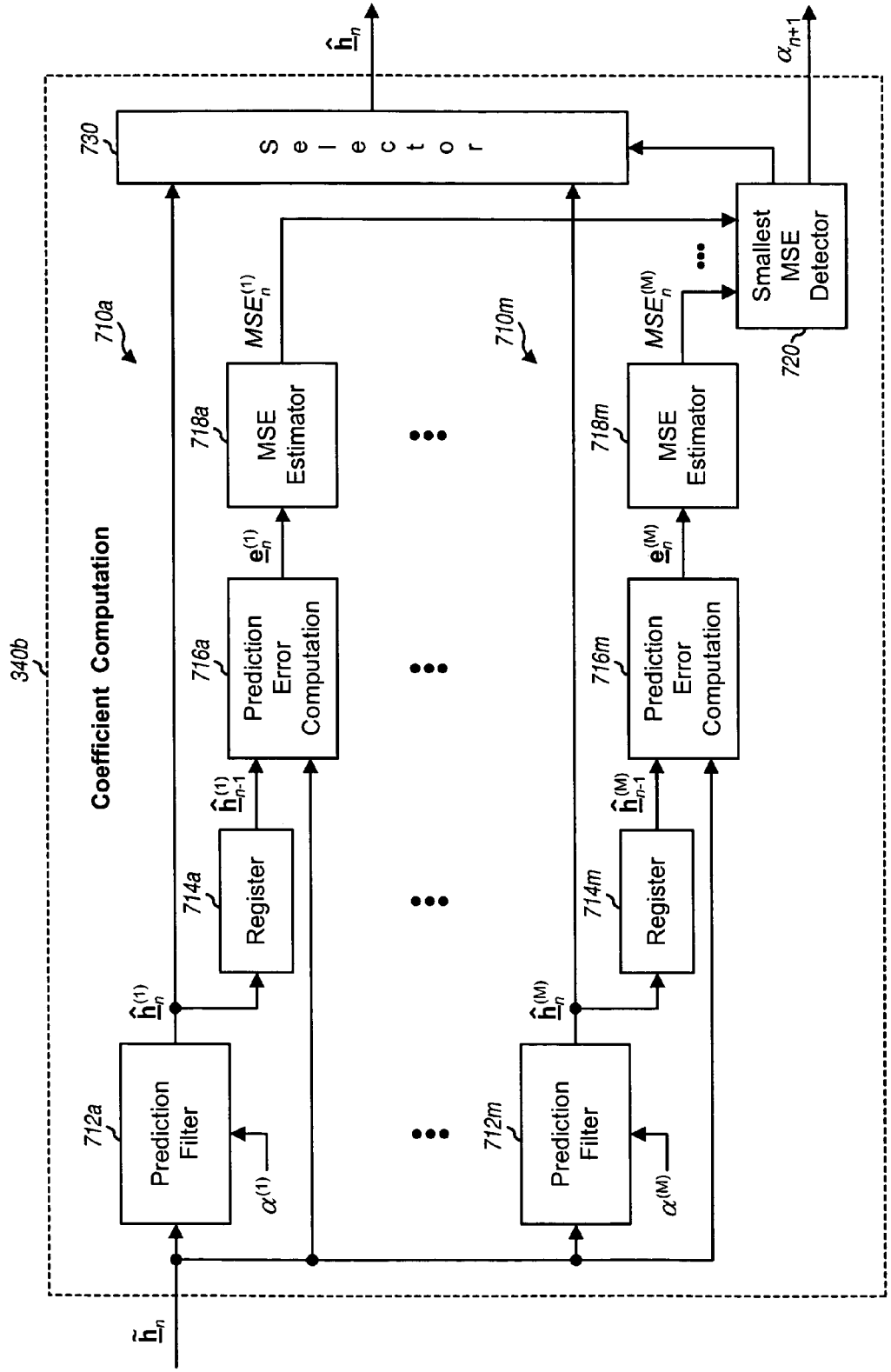

FIG. 7 shows an embodiment of a coefficient computation unit 340b that derives alpha based on a bank of prediction filters. Unit 340b includes M processing sections 710a through 710m for M different alphas, a detector 720, and a selector 730.

Within each processing section 710, a prediction filter 712 filters the initial CIRE $\underline{\hat{h}}_n$ with an assigned alpha $\alpha^{(m)}$, as shown in equation (11), and provides a filtered CIRE $\underline{\hat{h}}_n^{(m)}$. A register 714 stores the filtered CIRE $\underline{\hat{h}}_n^{(m)}$, which is used as the predicted CIRE for the next time interval. A unit 716 receives the initial CIRE $\underline{\hat{h}}_n$ and the predicted CIRE $\underline{\hat{h}}_{n-1}^{(m)}$ and computes the prediction errors $\underline{e}_n^{(m)}$, as shown in equation (12). An MSE estimator 718 derives the estimated prediction MSE based on the prediction errors $\underline{e}_n^{(m)}$, as shown in equation (15).

Detector 720 receives the estimated prediction MSEs from all M MSE estimators 718a through 718m, identifies the best prediction filter with the smallest estimated prediction MSE, and provides the alpha for the best prediction filter as the alpha $\alpha_{n+1}$ for the next time interval. Selector 730 provides the filtered CIRE from the best prediction filter as the filtered CIRE $\underline{\hat{h}}_n$.

In one embodiment, a separate channel IIR filter is maintained, and the alpha for this IIR filter is updated based on the alpha of the best prediction filter in each time interval. In another embodiment, the filtered CIRE from the best prediction filter is provided as the filtered CIRE $\underline{\hat{h}}_n$. In this embodiment, one of the prediction filters acts as the channel IIR filter in each time interval.

The use of a bank of prediction filters to derive alpha may provide several advantages. First, the filter bank settles to the best alpha value quickly. Second, the filter bank is able to adapt to changing channel conditions with a convergence delay that is dependent on the IIR filter used to estimate the prediction MSE in equation (15). However, the filter bank generally uses more computation and memory than the adaptive filter described above.

In an embodiment of the normalized variation technique, alpha is derived based on estimated variation of the wireless channel. The wireless channel may be modeled to have "memory", which is related to the time constant of the filtering for the initial CIRE. The variation of the wireless channel is inversely related to the memory of the channel. Hence, the variation of the channel or the memory of the channel may be estimated and used to determine a good value for alpha.

The initial CIRE is a noisy estimate of the CIR and may be expressed as:

$$\underline{\hat{h}}_n = \underline{h}_n + \underline{w}_n, \quad (16)$$

where $\underline{w}_n$ is an L×1 vector of noise and estimation errors in time interval n.

A normalized variation of the wireless channel may be defined as:

$$NV = \frac{E\{\|\underline{h}_n - \underline{h}_{n-1}\|^2\}}{E\{\|\underline{h}_n\|^2\}}, \quad \text{Eq (17)}$$

where $\mathcal{E}\{\|\underline{h}_n - \underline{h}_{n-1}\|^2\}$ is the expected difference in the CIR in time interval n, $\mathcal{E}\{\|\underline{h}_n\|^2\}$ is the expected channel energy in time interval n, and NV is the normalized variation of the wireless channel.

The normalized variation in equation (17) may be rewritten as:

$$NV = \frac{E\{\|\tilde{\underline{h}}_n - \tilde{\underline{h}}_{n-1}\|^2\} - 2E\{\|\underline{w}_n\|^2\}}{E\{\|\tilde{\underline{h}}_n\|^2\} - E\{\|\underline{w}_n\|^2\}}, \qquad \text{Eq (18)}$$

where $\mathcal{E}\{\|\tilde{\underline{h}}_n - \tilde{\underline{h}}_{n-1}\|^2\}$ is the expected difference in the initial CIRE in time interval n, $\mathcal{E}\{\|\tilde{\underline{h}}_n\|^2\}$ is the expected energy of the initial CIRE in time interval n, and $\mathcal{E}\{\|\underline{w}_n\|^2\}$ is the expected noise energy in time interval n.

Each of the three different expectation quantities in equation (18) may be estimated based on the initial CIRE. To estimate $\mathcal{E}\{\|\tilde{\underline{h}}_n - \tilde{\underline{h}}_{n-1}\|^2\}$, the quantity $\|\tilde{\underline{h}}_n - \tilde{\underline{h}}_{n-1}\|^2$ may first be computed as:

$$\tilde{D}_n = \|\tilde{\underline{h}}_n - \tilde{\underline{h}}_{n-1}\|^2 = \sum_{l=1}^{L} |\tilde{h}_n(l) - \tilde{h}_{n-1}(l)|^2, \qquad \text{Eq (19)}$$

where $\tilde{D}_n$ is the norm square of the differences between the initial channel tap estimates for time intervals n and n−1.

The difference norm square $\tilde{D}_n$ may be filtered as follows:

$$\hat{D}_n = \mu \cdot \tilde{D}_n + (1-\mu) \cdot \hat{D}_{n-1}, \qquad \text{Eq (20)}$$

where $\hat{D}_n$ is an estimate of $\mathcal{E}\{\|\tilde{\underline{h}}_n - \tilde{\underline{h}}_{n-1}\|^2\}$, and $\mu$ is a coefficient that determines the amount of averaging for $\hat{D}_n$.

Coefficient $\mu$ may be set to 0.5 or some other value.

To estimate $\mathcal{E}\{\|\tilde{\underline{h}}_n\|^2\}$, the quantity $\|\tilde{\underline{h}}_n\|^2$ may first be computed as:

$$\tilde{H}_n = \|\tilde{\underline{h}}_n\|^2 = \sum_{l=1}^{L} |\tilde{h}_n(l)|^2, \qquad \text{Eq (21)}$$

where $\tilde{H}_n$ is the norm square of the initial channel tap estimates for time interval n.

The channel norm square $\tilde{H}_n$ may be filtered as follows:

$$\hat{H}_n = \mu \cdot \tilde{H}_n + (1-\mu) \cdot \hat{H}_{n-1}, \qquad \text{Eq (22)}$$

where $\hat{H}_n$ is an estimate of $\mathcal{E}\{\|\tilde{\underline{h}}_n\|^2\}$.

To estimate $\mathcal{E}\{\|\underline{w}_n\|^2\}$, some channel taps at one or both ends of the initial CIRE may be assumed to contain pure noise and no signal. The noise energy for time interval n, denoted as $\tilde{W}_n$, may then be estimated as:

$$\tilde{W}_n = \frac{1}{A+B} \cdot \left( \sum_{l=1}^{A} |\tilde{h}_n(l)|^2 + \sum_{l=L-B+1}^{L} |\tilde{h}_n(l)|^2 \right). \qquad \text{Eq (23)}$$

Equation (23) assumes that the first A initial channel tap estimates as well as the last B initial channel tap estimates are pure noise. A and B may be selected to achieve good noise estimation performance. In an embodiment, L=64 and A=B=4. Other values may also be used for L, A and B. The noise energy may also be estimated in other manners, e.g., based on initial channel tap estimates with low energy.

The noise energy $\tilde{W}_n$ may be filtered as follows:

$$\hat{W}_n = \mu \cdot \tilde{W}_n + (1-\mu) \cdot \hat{W}_{n-1}, \qquad \text{Eq (24)}$$

where $\hat{W}_n$ is an estimate of $\mathcal{E}\{\|\underline{w}_n\|^2\}$.

The same coefficient $\mu$ may be used to derive all three quantities $\hat{D}_n$, $\hat{H}_n$ and $\hat{W}_n$, as shown in equations (20), (22) and (24), respectively. Alternatively, different coefficients may be used for different quantities.

The wireless channel may be represented with a Gauss-Markov channel model, as follows:

$$\underline{h}_n = \gamma \cdot \underline{h}_{n-1} + \sqrt{1-\gamma^2} \cdot \underline{u}_n, \qquad (25)$$

where $\gamma \in [0,1]$ may be viewed as the memory of the wireless channel, and $\underline{u}_n$ is an L×1 vector of independent identically distributed (i.i.d.) Gaussian random variables.

The channel memory $\gamma$ provides another way of parameterizing Doppler effect in the wireless channel. A larger value of $\gamma$ means that the wireless channel has a longer memory, which corresponds to more filtering.

Combining equations (17) and (25), the normalized variation may be given as:

$$NV = 2(1-\gamma). \qquad \text{Eq (26)}$$

The channel memory may then be expressed as:

$$\gamma = 1 - \frac{NV}{2}. \qquad \text{Eq (27)}$$

The three expectation quantities of the normalized variation in equation (18) may be estimated as described above. The channel memory may then be estimated as follows:

$$\hat{\gamma}_n = 1 - \frac{1}{2}\left( \frac{\hat{D}_n - 2\hat{W}_n}{\hat{H}_n - \hat{W}_n} \right), \qquad \text{Eq (28)}$$

where $\hat{\gamma}_n$ is the estimated channel memory in time interval n.

In an embodiment, alpha is determined for different values of channel memory $\gamma$ or normalized variation NV (e.g., based on computer simulation, calculation, and/or empirical measurements) and stored in a look-up table. Thereafter, the channel memory or normalized variation may be estimated as described above and provided to the look-up table. The look-up table would then return the alpha value to use to filter the initial CIRE.

In another embodiment, alpha is computed directly. A filter may be defined as follows:

$$\hat{\underline{h}}_n = a \cdot \tilde{\underline{h}}_n + b \cdot \hat{\underline{h}}_{n-1}, \qquad \text{Eq (29)}$$

where a and b are two coefficients. Given $\mathcal{E}\{\|\underline{h}_n\|^2\}$, $\mathcal{E}\{\|\underline{w}_n\|^2\}$ and $\gamma$, the values of a and b may be determined such that the expected estimation error $\xi = \mathcal{E}\{\|\hat{\underline{h}}_n - \underline{h}_n\|^2\}$ is minimized.

The solution to the above criterion may be derived as follows. Variables r and ρ may be defined as:

$$r = 1 - \frac{E\{\|w_n\|^2\}}{E\{\|h_n\|^2\}}, \text{ and} \qquad \text{Eq (30)}$$

$$\rho = \frac{2 - r \cdot (1 + \gamma^2)}{\gamma \cdot (r - 1)}. \qquad \text{Eq (31)}$$

The values of a and b that satisfy the above criterion may then be given as:

$$b^* = \frac{-\rho - \sqrt{\rho^2 - 4}}{2}, \text{ and} \qquad \text{Eq (32)}$$

$$a^* = \frac{1 - b^2}{2 - r \cdot (1 - b \cdot \gamma)}. \qquad \text{Eq (33)}$$

Alpha may then be expressed as:

$$\alpha_{n+1} = \frac{a}{a+b}. \qquad \text{Eq (34)}$$

Alpha may be derived based on the normalized variation technique as follows. Initially, the quantities $\hat{D}_{n-1}$, $\hat{H}_{n-1}$ and $\hat{W}_{n-1}$ are initialized to zero. Thereafter, alpha may be derived in each time interval n as follows:

1. Obtain an initial CIRE $\underline{\tilde{h}}_n$, e.g., as shown in equation (3),
2. Compute $\hat{D}_n$, $\hat{H}_n$ and $\hat{W}_n$ based on the initial CIRE, as shown in equations (19) through (24),
3. Compute an estimate of the channel memory, $\hat{\gamma}_n$, as shown in equation (28),
4. Compute an estimate of r as $$\hat{r}_n = 1 - \frac{\hat{W}_n}{\hat{H}_n - \hat{W}_n},$$

5. Compute an estimate of ρ as shown in equation (31),
6. Compute estimates of a and b as shown in equations (32) and (33), and
7. Compute alpha as shown in equation (34).

The computed alpha $\alpha_{n+1}$ may be used to filter the initial CIRE in the next time interval.

Figure 8:
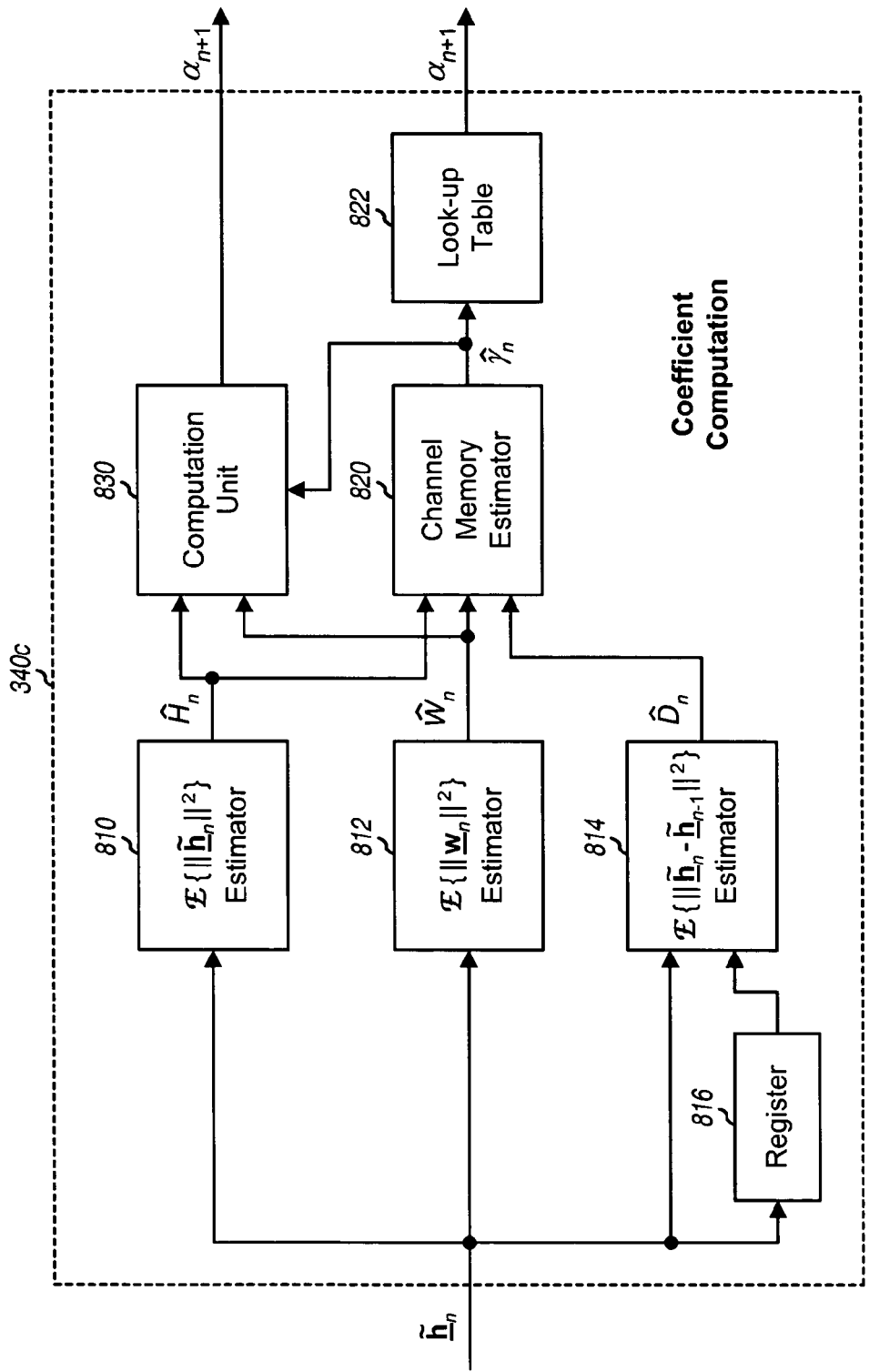

FIG. 8 shows an embodiment of a coefficient computation unit 340c that derives alpha based on the normalized variation technique. Within unit 340c, the initial CIRE $\underline{\tilde{h}}_n$ is provided to units 810, 812 and 814 and a register 816. Register 816 stores $\underline{\tilde{h}}_n$ and provides $\underline{\tilde{h}}_{n-1}$. Unit 810 derives an estimate of $\mathcal{E}\{\|\underline{\tilde{h}}_n\|^2\}$, as shown in equations (21) and (22), and provides this estimate as $\hat{H}_n$. Unit 812 derives an estimate of $\mathcal{E}\{\|\underline{w}_n\|^2\}$, as shown in equations (23) and (24), and provides this estimate as $\hat{W}_n$. Unit 814 also receives $\underline{\tilde{h}}_{n-1}$ from register 816 and derives an estimate of $\mathcal{E}\{\|\underline{\tilde{h}}_n - \underline{\tilde{h}}_{n-1}\|^2\}$, as shown in equations (19) and (20), and provides this estimate as $\hat{D}_n$.

In an embodiment, a channel memory estimator 820 estimates the channel memory based on $\hat{H}_n$, $\hat{W}_n$ and $\hat{D}_n$, as shown in equation (28), and provides the estimated channel memory $\hat{\gamma}_n$. A look-up table 822 receives the estimated channel memory and provides the alpha $\alpha_{n+1}$ for the next time interval. In another embodiment, a computation unit 830 receives $\hat{H}_n$, $\hat{W}_n$ and $\hat{\gamma}_n$ and computes the alpha $\alpha_{n+1}$, as shown in equations (30) through (34).

For clarity, the filtering techniques have been specifically described for filtering an initial CIRE to reduce estimation errors. In general, these techniques may be used to filter any type of scalar, vector, and matrix. For example, a sequence of vectors $\underline{v}_i$ may be obtained for different values of parameter i. Parameter i may be for time, frequency, and so on. The sequence of vectors $\underline{v}_i$ may be filtered based on any of the techniques described above to reduce estimation errors and obtain an output sequence of vectors having improved characteristics.

Figure 9:
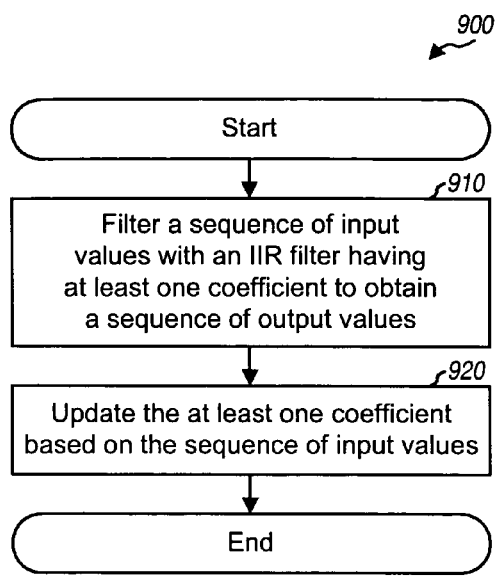
FIG. 9 shows a process for filtering noisy estimates.

FIG. 9 shows an embodiment of a process 900 for filtering noisy estimates. A sequence of input values is filtered with an IIR filter having at least one coefficient to obtain a sequence of output values (block 910). In an embodiment, the sequence of input values is for an initial CIRE, and the sequence of output values is for a filtered CIRE. In another embodiment, the sequence of input values is for an initial frequency-domain channel frequency response estimate, and the sequence of output values is for a filtered channel frequency response estimate. The input and output values may also be for other quantities. The at least one coefficient of the IIR filter is updated based on the sequence of input values, e.g., using any of the techniques described herein (block 920).

Figure 10:
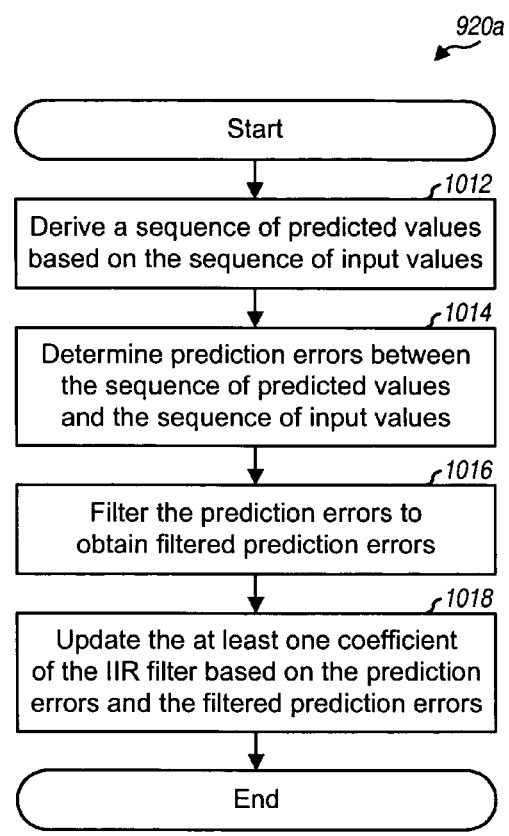

FIG. 10 shows an embodiment of a process 920a for updating the at least one coefficient of the IIR filter with an adaptive filter. Process 920a may be used for block 920 in FIG. 9. A sequence of predicted values is derived based on the sequence of input values (block 1012). The sequence of predicted values may be equal to the sequence of output values, appropriately delayed. Prediction errors between the sequence of predicted values and the sequence of input values are determined (block 1014). The prediction errors are filtered (e.g., with the coefficient(s) of the IIR filter) to obtain filtered prediction errors (block 1016). The coefficient(s) of the IIR filter are updated based on the prediction errors and the filtered prediction errors (block 1018). An error gradient of the prediction errors may also be determined in other manners, and the coefficient(s) of the IIR filter may be updated based on the error gradient.

FIG. 11 shows an embodiment of a process 920b for deriving the at least one coefficient of the IIR filter with a bank of prediction filters. Process 920b may also be used for block 920 in FIG. 9. The sequence of input values is filtered with multiple prediction filters to obtain multiple sequences of predicted values (block 1112). Each prediction filter has a different set of at least one coefficient. The prediction filter with the smallest prediction error among the multiple prediction filters is identified. This may be achieved by computing errors between the sequence of input values and the sequence of predicted values for each prediction filter (block 1114), determining the mean square error for each prediction filter based on the errors for the prediction filter (block 1116), and identifying the prediction filter with the smallest mean square error (block 1118). The set of at least one coefficient for the identified prediction filter is selected for use to filter the sequence of input values (block 1120).

FIG. 12 shows an embodiment of a process 920c for updating the at least one coefficient of the IIR filter based on the normalized variation technique. Process 920c may also be used for block 920 in FIG. 9. The sequence of input samples is a noisy estimate of a sequence of actual values. Variation of the sequence of actual samples is estimated based on the sequence of input values. This may be achieved by estimating the energy of the sequence of input values (block 1212), estimating the noise in the sequence of input values (block 1214), and estimating the variation of the sequence of input samples (block 1216). The variation of the sequence of actual samples may then be estimated based on the estimated energy, estimated noise, and estimated variation of the sequence of input values (block 1218). The at least one coefficient of the IIR filter is then determined based on the estimated variation of the sequence of actual samples, e.g., using a look-up table or by direct calculation (block 1220).

The filtering techniques described herein may be implemented by various means. For example, these techniques may be implemented in hardware, firmware, software, or a combination thereof. For a hardware implementation, the processing units used to perform filtering and updating may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 292 in FIG. 2) and executed by a processor (e.g., processor 290). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured to filter a sequence of input values with an infinite impulse response (IIR) filter having at least one coefficient to obtain a sequence of output values, and to derive a sequence of predicted values based on the sequence of input values, to determine prediction errors between a sequence of predicted values and the sequence of input values, to filter the determined prediction errors, to calculate a partial derivative term based on the determined prediction errors and filtered determined prediction errors, and to update the at least one coefficient based on the partial derivative term; and
   a memory coupled to the at least one processor.

2. The apparatus of claim 1, wherein the sequence of input values is for an initial channel impulse response estimate (CIRE) and the sequence of output values is for a filtered CIRE.

3. The apparatus of claim 1, wherein the IIR filter has a single coefficient.

4. The apparatus of claim 1, wherein the at least one processor is configured to use the sequence of output values as the sequence of predicted values.

5. The apparatus of claim 1, wherein the at least one processor is configured to filter the prediction errors with the at least one coefficient of the IIR filter to obtain the filtered prediction errors.

6. The apparatus of claim 1, wherein the at least one processor is configured to determine an error gradient of the prediction errors and to update the at least one coefficient based on the error gradient.

7. The apparatus of claim 1, wherein the sequence of input samples is a noisy estimate of a sequence of actual values, and wherein the at least one processor is configured to estimate memory of a communication channel based on the sequence of input values and to determine the at least one coefficient based on the estimated channel memory.

8. A method comprising:
   filtering a sequence of input values with an infinite impulse response (IIR) filter having at least one coefficient to obtain a sequence of output values;
   deriving a sequence of predicted values based on the sequence of input values;
   determining prediction errors between the sequence of predicted values and the sequence of input values;
   filtering the determined prediction errors;
   calculating a partial derivative term based on the determined prediction errors and filtered determined prediction errors; and
   updating the at least one coefficient based on the partial derivative term.

9. An apparatus comprising:
   means for filtering a sequence of input values with an infinite impulse response (IIR) filter having at least one coefficient to obtain a sequence of output values;
   means for deriving a sequence of predicted values based on the sequence of input values;
   means for determining prediction errors between the sequence of predicted values and the sequence of input values;
   means for filtering the determined prediction errors;
   means for calculating a partial derivative term based on the determined prediction errors and filtered determined prediction errors; and
   means for updating the at least one coefficient based on the partial derivative term.

10. A processor readable media for storing instructions operable in a wireless device to:
    filter a sequence of input values with an infinite impulse response (IIR) filter having at least one coefficient to obtain a sequence of output values;
    derive a sequence of predicted values based on the sequence of input values;
    determine prediction errors between the sequence of predicted values and the sequence of input values;
    filter the determined prediction errors;
    calculating a partial derivative term based on the determined prediction errors and filtered determined prediction errors; and
    update the at least one coefficient based on the partial derivative term.

11. An apparatus comprising:
    at least one processor configured to filter an initial channel impulse response estimate (CIRE) with an infinite impulse response (IIR) filter having a coefficient to obtain a filtered CIRE, to derive a predicted CIRE based on the initial CIRE, to determine errors between the initial CIRE and the predicted CIRE, to filter the errors to obtain filtered errors, to calculate a partial derivative term based on the determined errors and filtered errors, and to update the at least one coefficient based on the partial derivative term; and a memory coupled to the at least one processor.

12. The apparatus of claim 11, wherein the at least one processor is configured to use the filtered CIRE as the predicted CIRE and to filter the errors with the coefficient of the IIR filter to obtain the filtered errors.

13. The apparatus of claim 11, wherein the at least one processor is configured to derive the initial CIRE by despreading input samples with a pseudo-random number (PN) sequence at different time offsets.

* * * * *

UNITED STATES PATENT AND TRADEMARK OFFICE
CERTIFICATE OF CORRECTION

PATENT NO.        : 7,746,970 B2                                       Page 1 of 1
APPLICATION NO.   : 11/489087
DATED             : June 29, 2010
INVENTOR(S)       : Mergen et al.

It is certified that error appears in the above-identified patent and that said Letters Patent is hereby corrected as shown below:

Column 15, line 47, claim 1: "a sequence of predicted values" to read as --the sequence of predicted values--

Signed and Sealed this
Twenty-sixth Day of July, 2011

David J. Kappos
*Director of the United States Patent and Trademark Office*